United States Patent
Fu et al.

(10) Patent No.: US 10,861,415 B2
(45) Date of Patent: Dec. 8, 2020

(54) DISPLAY DEVICE WITH THROUGHPUT CALIBRATION

(71) Applicant: Facebook Technologies, LLC, Menlo Park, CA (US)

(72) Inventors: Yijing Fu, Redmond, WA (US); Pasi Saarikko, Kirkland, WA (US); Hee Yoon Lee, Bellevue, WA (US); Wanli Chi, Sammamish, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 16 days.

(21) Appl. No.: 16/103,684

(22) Filed: Aug. 14, 2018

(65) Prior Publication Data
US 2020/0058266 A1 Feb. 20, 2020

(51) Int. Cl.
| | | |
|---|---|---|
| G09G 5/06 | (2006.01) | |
| G02B 6/10 | (2006.01) | |
| G02B 27/00 | (2006.01) | |
| G02B 6/27 | (2006.01) | |
| F21V 8/00 | (2006.01) | |
| G02B 27/01 | (2006.01) | |

(52) U.S. Cl.
CPC ............. *G09G 5/06* (2013.01); *G02B 6/0036* (2013.01); *G02B 6/10* (2013.01); *G02B 6/27* (2013.01); *G02B 27/00* (2013.01); *G02B 27/0172* (2013.01); *G02B 27/0179* (2013.01); *G02B 2027/0123* (2013.01); *G02B 2027/0138* (2013.01); *G02B 2027/0178* (2013.01); *G02B 2027/0187* (2013.01); *G09G 2320/0242* (2013.01); *G09G 2320/0666* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 9,905,168 B1 | 2/2018 | Richards et al. | |
| 2013/0093646 A1* | 4/2013 | Curtis | G06F 3/1446 345/1.3 |
| 2017/0122725 A1 | 5/2017 | Yeoh et al. | |
| 2018/0084232 A1 | 3/2018 | Belenkii et al. | |
| 2019/0041634 A1* | 2/2019 | Popovich | G01S 17/66 |

OTHER PUBLICATIONS

"8.4: Distinguished Paper: A Full Color Eyewear Display using Holographic Planar Waveguides" Hiroshi Mukawa, Katsuyuki Akutsu, Ikuo Matsumura, Satoshi Nakano, Takuji Yoshida, Mieko Kuwahara, Kazuma Aiki, Masataka Ogawa SID 2008, 2008 SID International Symposium, Society for Information Display, May 18, 2008 p. 89-92.
PCT/US2019/046087 Search Report dated Oct. 22, 2019.

* cited by examiner

*Primary Examiner* — Matthew Salvucci
(74) *Attorney, Agent, or Firm* — Pequignot + Myers; Matthew A. Pequignot

(57) ABSTRACT

A wearable display device and a calibration method for the wearable display device are provided. The wearable display device or its component(s) may exhibit optical throughput dependent on beam angle or beam coordinate at the eyebox. The linear or angular dependencies of throughput may be accounted for when generating an image to be displayed, to lessen or offset these dependencies during operation of the wearable display.

19 Claims, 11 Drawing Sheets

DISPLAY DEVICE WITH THROUGHPUT CALIBRATION

TECHNICAL FIELD

The present disclosure relates to visual displays and display systems, and in particular to wearable displays, display systems, and methods therefor.

BACKGROUND

Head-mounted displays (HMDs) are used to provide virtual scenery to a user, or to augment a real scenery with additional information or virtual objects. The virtual or augmented scenery can be three-dimensional (3D) to enhance the experience and to match virtual objects to the real 3D scenery observed by the user. In some HMD systems, a head and/or eye position and orientation of the user are tracked, and the displayed scenery is dynamically adjusted depending on the user's head orientation and gaze direction, to provide experience of immersion into a simulated or augmented 3D environment.

It is desirable to reduce size and weight of a head-mounted display. Lightweight and compact near-eye displays reduce the strain on user's head and neck, and are generally more comfortable to wear. Oftentimes, an optics block of a wearable display is the bulkiest and heaviest module of the display, especially when the optics block includes bulk optics such as refractive lenses and cube beamsplitters. Compact planar optical components, such as waveguides, gratings, Fresnel lenses, etc., are sometimes used to reduce the size and weight of the optics block. However, compact planar optics may be prone to distortions, non-uniformity, ghosting, residual coloring, and other drawbacks, which hinder their use in wearable optical display systems.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 1:
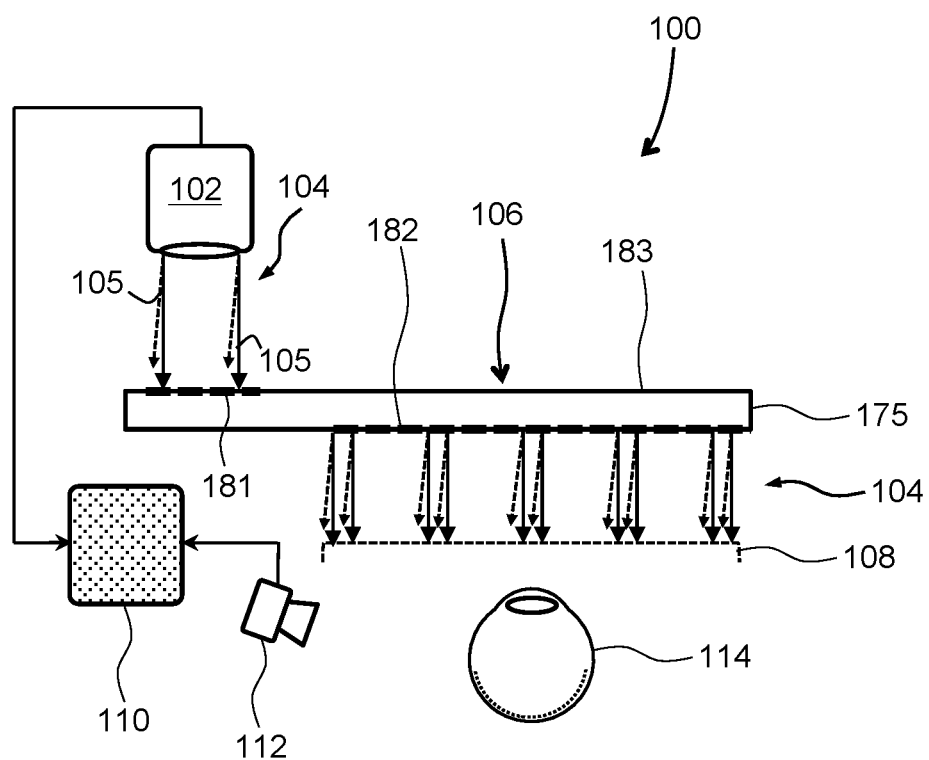
FIG. 1 is a schematic view of a near-eye display (NED) in accordance with the present disclosure.
Figure 6:
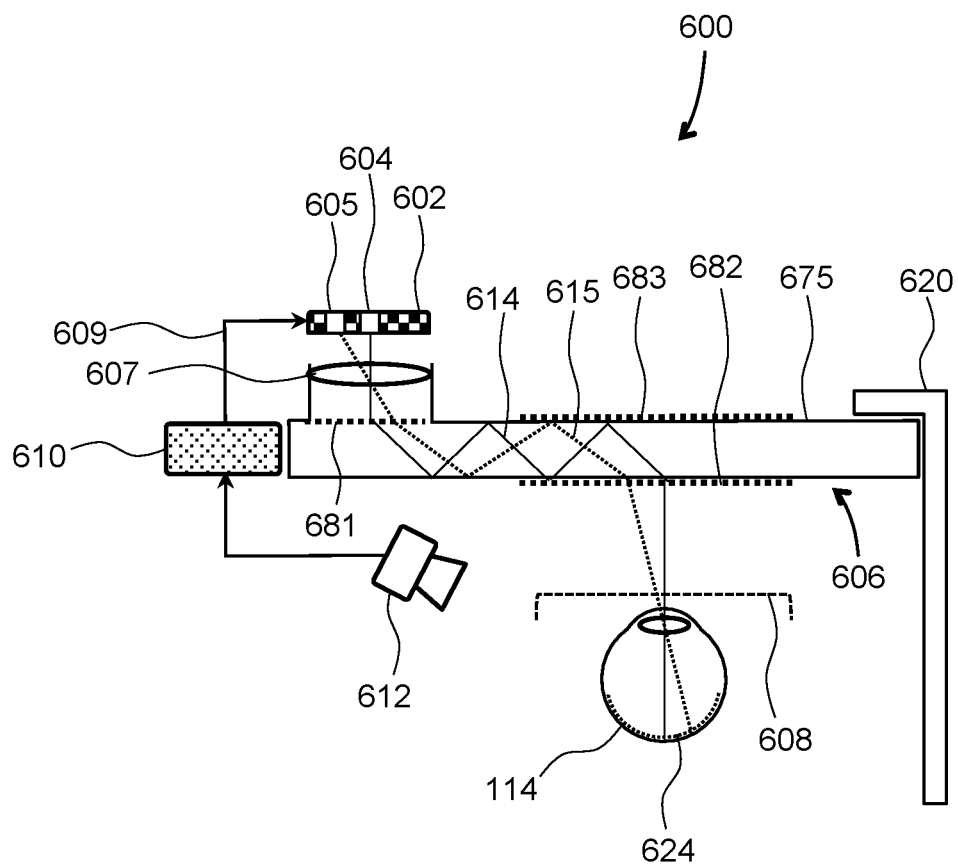
FIG. 6 is a schematic top view of a NED device, in accordance with an embodiment of the present disclosure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1 and 6, similar reference numerals refer to similar elements.

An optics block of a projector-based wearable display may include a device e.g. a waveguide for carrying an image in angular domain, generated by a projector, towards an eyebox of the display. The device may have an angle-dependent throughput which, for waveguide-based pupil expanders, may also be dependent on a coordinate of a light beam at the eyebox. Furthermore, the throughput's beam angle and coordinate dependence may be color channel specific, leading to an undesired coloring of the displayed image. In accordance with the disclosure, a calibration procedure may be applied to locally modify, i.e. pre-emphasize or attenuate, optical power density distributions in the color channel(s) of the image to lessen or offset the undesired coloring. The applied calibration may be made dependent on the eye pupil position at the eyebox. The eye pupil position may be determined in real time by an eye-tracking system.

In accordance with the present disclosure, there is provided a near-eye display (NED) comprising an image projector for providing image light comprising a channel, a waveguide pupil expander, and a controller. The waveguide pupil expander is coupled to the image projector for relaying the image light to an eyebox of the NED. Throughput of the waveguide pupil expander has a dependence on a beam angle at the eyebox. The controller is operably coupled to the image projector and configured to adjust a distribution of optical power density of the channel of the image light to at least partially offset the dependence of throughput of the waveguide pupil expander on the beam angle. The throughput may have a dependence on a beam coordinate at the eyebox, and the NED may further include an eye tracking system for providing at least one of position or orientation of a user's eye at the eyebox. The controller may be operably coupled to the eye tracking system and configured to adjust the distribution of optical power density of the channel depending on the at least one of position or orientation of the user's eye determined by the eye tracking system, to at least partially offset the dependence of throughput on the beam coordinate at the eyebox. The controller may be configured to use the at least one of the position or orientation of the user's eye to determine a pupil position of the user's eye at the eyebox. The channel may include at least one of a color channel or a luminance channel.

When the image light comprises not one but a plurality of color channels, the throughput of the waveguide pupil expander for each color channel may have an angular dependence, whereby the waveguide pupil expander may have an angular-dependent color transfer function variation. In such embodiments, the controller may be configured to adjust the distribution of optical power density of at least one of the plurality of color channels to at least partially offset the angular-dependent color transfer function variation of the waveguide pupil expander. An eye tracking system may be provided for determining at least one of position or orientation of a user's eye at the eyebox, and the controller may be operably coupled to the eye tracking system and configured to adjust the distribution of optical power density of the at least one of the plurality of color channels depending on the at least one of position or orientation of a user's eye determined by the eye tracking system.

In embodiments where the NED includes the eye tracking system and where the waveguide pupil expander has a color transfer function having a dependence on the pupil position, the controller may be operably coupled to the eye tracking system and configured to obtain an image to be displayed by the NED, and modify a color distribution of the image to at least partially offset the dependence of the color transfer function of the waveguide pupil expander on the pupil position determined by the eye tracking system. The NED may further include memory having stored thereon data for modifications of the color distribution of the image at each pupil position at the eyebox. The controller may be operably coupled to the memory for retrieving at least a portion of the data corresponding to the pupil position determined by the eye tracking system, for modifying the color distribution of the image to at least partially offset the dependence of the color transfer function on the pupil position. The data may include a look-up table, for example. The waveguide pupil expander may include a one-dimensional (1D) or a two-dimensional (2D) waveguide pupil expander.

In accordance with an aspect of the present disclosure, there is further provided a display device comprising an electronic display, an optics block, and a controller. The electronic display may include a plurality of pixels for providing a plurality of light beams in accordance with image data received by the electronic display. The optics block may be configured to receive the plurality of light beams and to provide the plurality of light beams to an eyebox of the display device, such that an angle of a first light beam of the plurality of light beams at the eyebox corresponds to a coordinate of a corresponding first pixel of the plurality of pixels of the electronic display, wherein throughput of the optics block for the first light beam has a dependence on a beam angle of the first light beam at the eyebox. The controller may be operably coupled to the electronic display and configured to modify the image data so as to at least partially offset the dependence of the throughput on the beam angle.

In embodiments where the throughput further has a dependence on a beam coordinate of the first light beam at the eyebox, the display device may further include an eye tracking system for determining at least one of position and orientation of a user's eye at the eyebox. The controller may be operably coupled to the eye tracking system and configured to update the image data so as to at least partially offset the dependence of the throughput on the coordinate and the angle of the first light beam, by taking into account the at least one of position and orientation of the user's eye determined by the eye tracking system. The electronic display may include a plurality of color channels, wherein the throughput of the optics block has a dependence on the coordinate and the angle of the first light beam for each color channel. The controller may be configured to update the image data on per color channel basis, to at least partially offset the dependence of the throughput of the optics block on the coordinate and the angle of the first light beam for each color channel, by taking into account the at least one of position and orientation of a user's eye determined by the eye tracking system. The optics block may include a waveguide pupil expander.

In accordance with another aspect of the present disclosure, there is further provided a method of calibration of a pupil expander. The method may include providing image light at an input pupil of the pupil expander, the image light comprising a channel; obtaining an angular distribution of optical power density of the channel at a first location at an output pupil of the pupil expander; and determining an angular dependence of throughput of the pupil expander from the obtained angular distribution. The method may further include determining the angular dependence of throughput at the first location comprises placing a camera at the first location and obtaining a first image with the camera. The method may further include determining the angular dependence of throughput of the pupil expander at a plurality of locations including the first location. Determining the angular dependence of throughput at the plurality of locations may include placing a camera at each location and obtaining a corresponding image with the camera. The channel may include at least one of a color channel or a luminance channel.

Referring now to FIG. 1, a near-eye display (NED) 100 includes an image projector 102 for providing image light 104. A pupil expander 106, i.e. a waveguide pupil expander in this example, is optically coupled to the image projector 102 for relaying the image light 104 to an eyebox 108 of the NED 100. A controller 110 is operably coupled to the image projector 102. The controller may be configured to provide images to the image projector 102. The image light 104 may include an image in angular domain, where different angles of beams 105 of the image light 104 correspond to different coordinates of a pixel in the image to be displayed. In general, the image light 104 may include at least one channel, i.e. a luminance channel and/or at least one color channel. Typically, three color channels are provided for a full-color display. Each channel corresponds to a particular color component of the image to be displayed by the image projector 102.

The pupil expander 106 may include a waveguide 175 having an in-coupling diffraction grating 181, an out-coupling diffraction grating 182, and a pupil expansion diffraction grating 183. The in-coupling diffraction grating 181 receives the image light 104, which then propagates in the waveguide 175 in a zigzag pattern diffracting in turns on the pupil expansion diffraction grating 183 and the out-coupling diffraction grating 182. At each diffraction on the out-coupling diffraction grating 182, a portion of the image light 104 exits the waveguide 175 as shown, thereby expanding the output pupil, i.e. the eyebox 108, of the NED 100.

The multiple reflections may cause the pupil expander 106 to have an angular dependence of throughput. In other words, a portion of optical power of a light beam carried by the pupil expander 106 to the eyebox 108 may depend on an angle of the light beam at the eyebox 108. As noted above, the beam angle at the eyebox 108 corresponds to a coordinate of a pixel in the image to be displayed. Accordingly, the controller 110 may be configured to adjust pixel values of the image, that is, to adjust or a distribution of optical power density of the channel of the image light 104, to at least partially offset the dependence of throughput of the pupil expander 106 on the beam angle.

The throughput of the pupil expander 106 may further depend on a coordinate of an output optical beam at the eyebox 108. For such cases, the NED 100 may further use an eye tracking system 112. The eye tracking system 112 can be configured to determine at least one of position or orientation of a user's eye 114 at the eyebox 108, from which a pupil coordinate of the user's eye 114 may be obtained. The controller 110 may be operably coupled to the eye tracking system 112 and configured to adjust, e.g. locally attenuate or pre-emphasize, the distribution of optical power density of the channel or channels depending on the beam coordinate computed from the position and/or orientation of the user's eye 114 determined by the eye tracking system 112. More specifically, the determined position and/or orientation of the user's eye 114 at the eyebox 108 may be used to calculate coordinate(s) of the pupil of the user's eye 114, from which the corresponding beam coordinate(s) may be obtained. The controller 110 may be configured to at least partially offset the beam coordinate dependence of throughput of the pupil expander 106 by using the determined pupil position at the eyebox 108.

Figure 2:
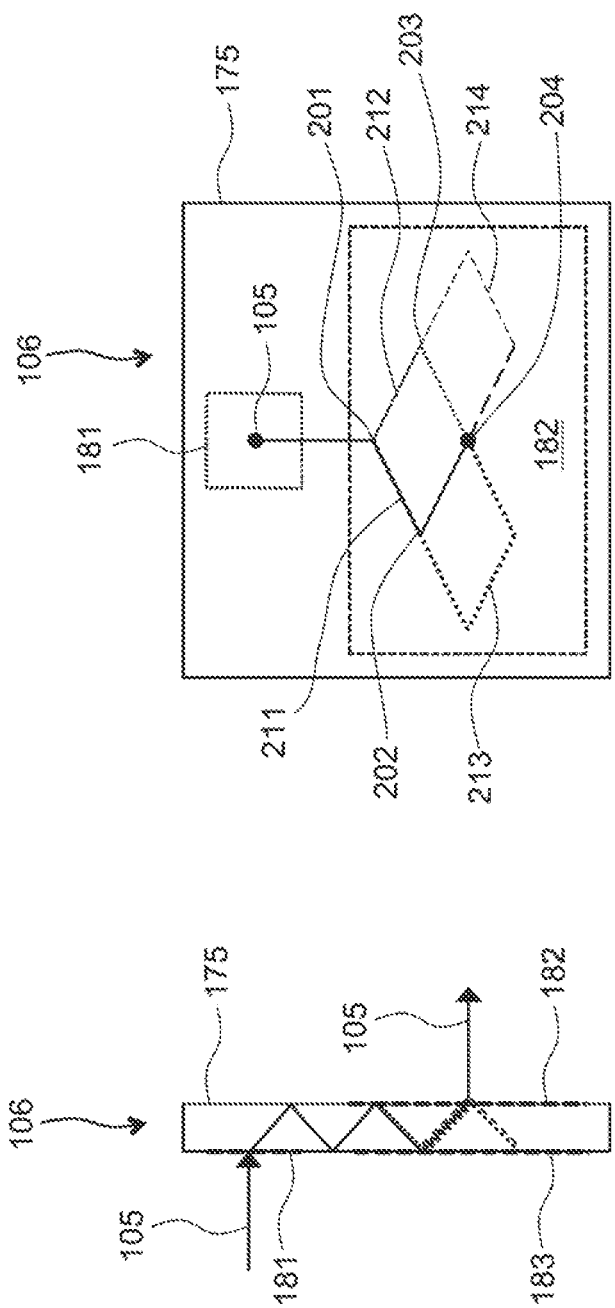
FIG. 2A is a side cross-sectional view of a waveguide pupil expander.
FIG. 2B is a plan view of the waveguide pupil expander of FIG. 2A, showing multiple paths of an optical beam.

Origins of the beam coordinate and angle dependence of the throughput of the pupil expander 106 of FIG. 1 are explained with reference to FIGS. 2A and 2B. FIG. 2A shows the pupil expander 106 in side view. The beam 105 of the image light 104 (FIG. 1) impinges onto the in-coupling diffraction grating 181 (FIG. 2A), which diffracts the beam 105 to propagate towards the out-coupling diffraction grating 182. There, at a first point 201, the optical path of the beam 105 splits in two (FIG. 2B): a first path 211 shown with a solid line, and a second path 212 shown with a thin dotted line. A third path 213, shown with a thick dotted line, splits off at a second point 202. Finally a fourth path 214, shown with a dashed line, splits off at a third point 203. All four paths 211, 212, 213, and 214 meet at a fourth point 204, where the beam 105 exits the waveguide 175. Out of the four paths 211, 212, 213, and 214, two—the first 211 and second 212—have a nominally equal path length; and two—the third 213 and the fourth 214—have a nominally equal, albeit different from the first 211 and second 212 paths, path length. Thus, a four-path interferometer is essentially formed, which may result in a wavelength dependence of the throughput of the pupil expander 106. Furthermore, since the path lengths and their differences depend on the angle of incidence, or on the angle of diffraction of the beam 105 at the out-coupling diffraction grating 182 at the eyebox 108 (not shown in FIG. 2B), the throughput of the pupil expander 106 will also depend on the beam 105 angle. Yet furthermore, since the waveguide 175 may have a slight wedge or waving due to manufacturing tolerances, the path lengths and their differences may also depend on the beam 105 coordinate at the out-coupling diffraction grating 182, or at the eyebox 108.

Figure 3:
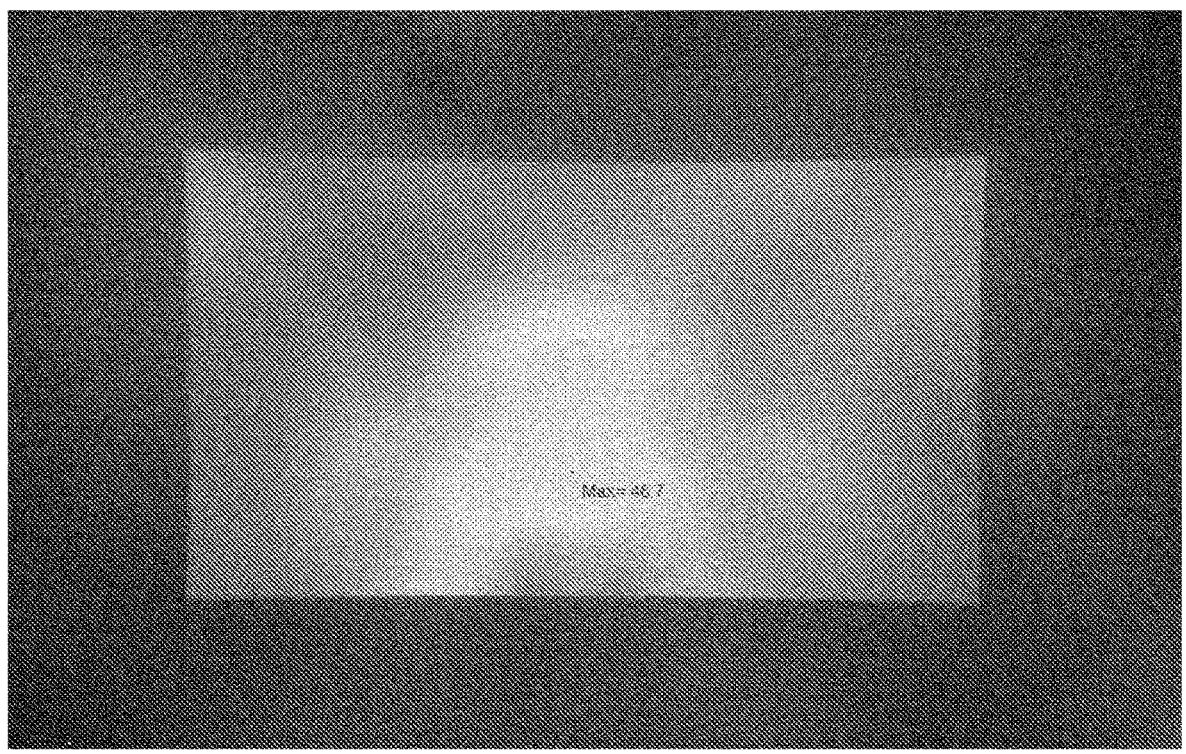
FIG. 3 is a two-dimensional (2D) angular distribution of optical power density of a 2D waveguide pupil expander prototype.
Figure 4A:
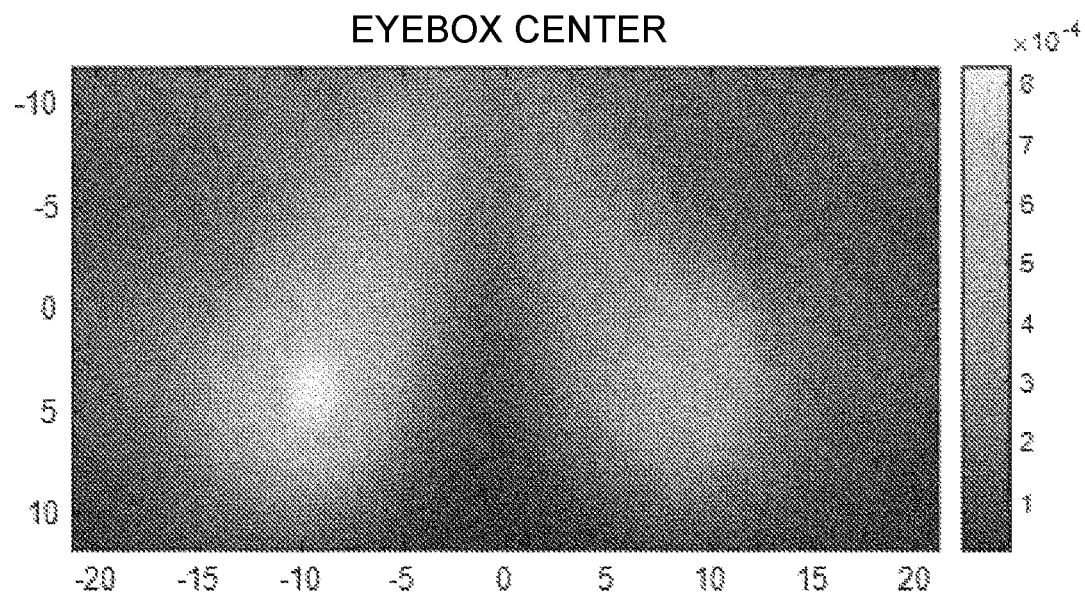
FIGS. 4A to 4E are 2D angular distributions of throughput of a 2D waveguide pupil expander prototype at various locations.
Figure 4B:
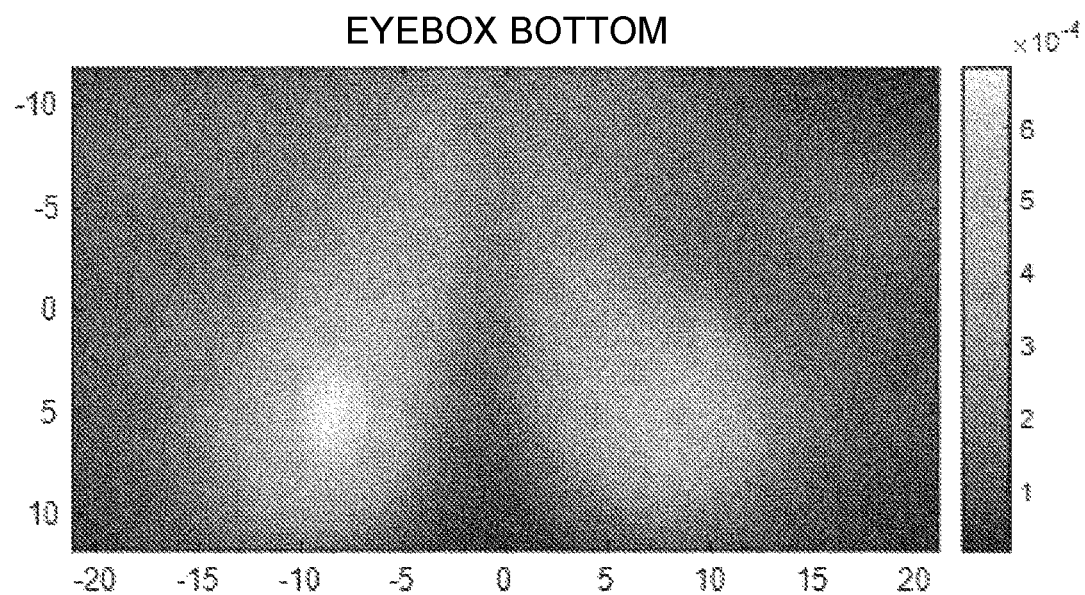
Figure 4C:
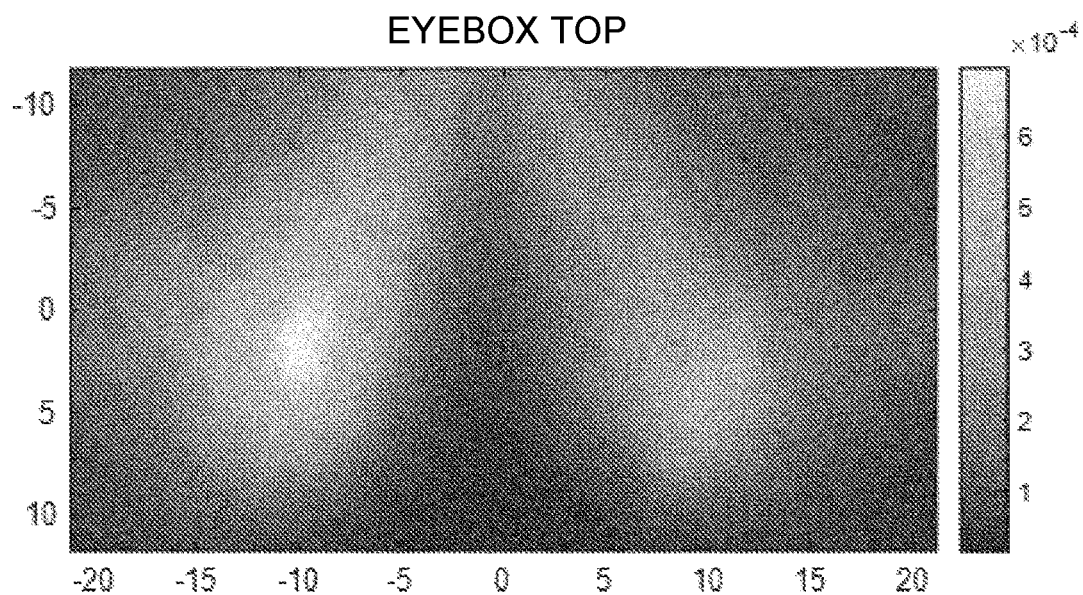
Figure 4D:
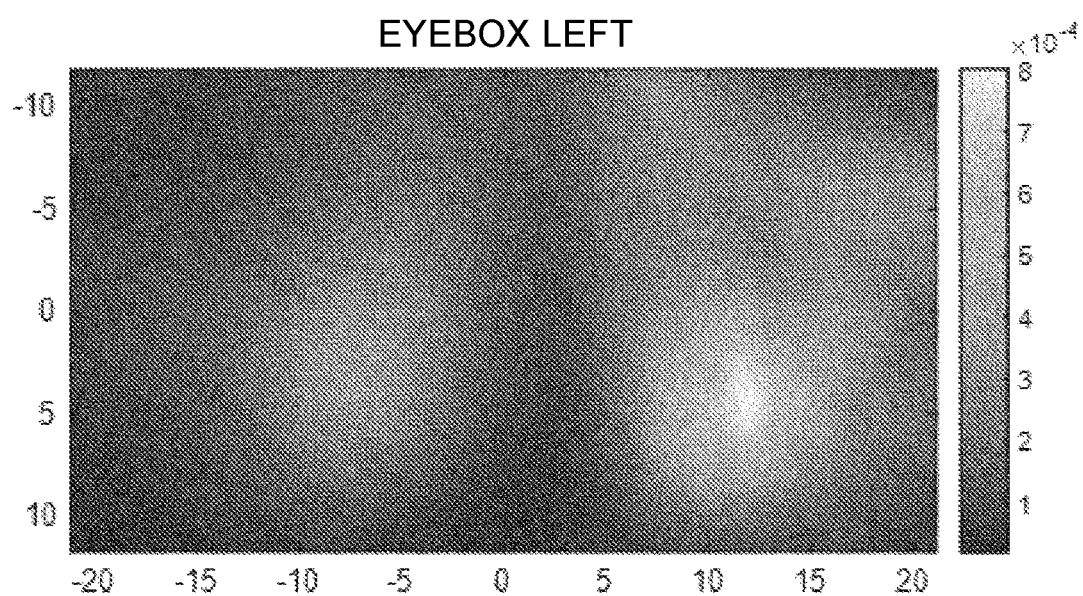
Figure 4E:
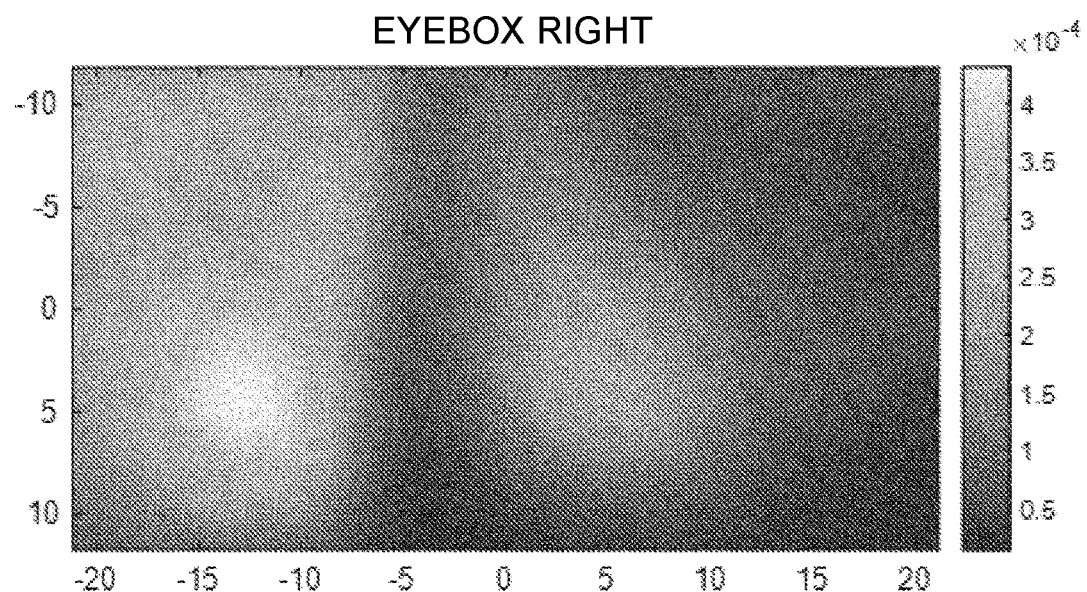

The angular dependence of the throughput is illustrated in FIG. 3, which shows an angular distribution of optical power density of output light at a uniform angular distribution of input light, for a manufactured waveguide sample. The optical power density is shown as a 2D grayscale map. The maximum variation of the optical power density, corresponding to the maximum variation of throughput, is about 90%, or 9 times.

Figure 5:
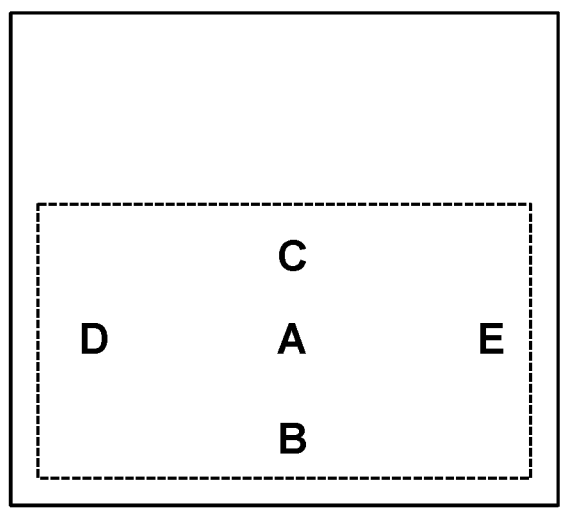
FIG. 5 is a schematic plan view of the 2D waveguide pupil expander prototype of FIGS. 4A to 4E.

In FIGS. 4A, 4B, 4C, 4D, and 4E, an angular dependence of throughput of a waveguide pupil expander sample is shown at five locations on the waveguide termed "A", "B", "C", "D", and "E" respectively. The locations "A" to "E" are shown schematically in FIG. 5. The horizontal and vertical axes respectively denote horizontal and vertical output beam angles, or viewing angle directions, in degrees. The throughput magnitude is shown in the scale bar on the left of each of FIGS. 4A to 4E. One can see that the throughput angle maps are different for the different locations "A", "B", "C", "D", and "E" on the waveguide. The controller 110 (FIG. 1) can be configured to multiply the images to be displayed with an inverse of the 2D throughput maps of FIGS. 4A, 4B, 4C, 4D, and 4E, depending on where the pupil of the user's eye 114 is. Such data may be conveniently stored in memory, e.g. as a look-up table storing different throughput maps as a function of x and y coordinates of the user's eye 114 pupil.

The image data to be displayed may be stored in a number of formats. By way of a non-limiting example, a luminance channel may be provided, showing the luminance as a 2D table of pixel brightness values. For color displays, both luminance and chrominance tables may be provided, the chrominance table showing the color of each pixel of the image. A color image may also be represented by brightness maps for several color channels, for example red (R), green (G), and blue (B) color channel. Each of these color channels may be represented by a 2D table of corresponding sub-pixel brightness, for example R sub-pixel brightness, G sub-pixel brightness, and B sub-pixel brightness. A 2D map or a corresponding correction table can be provided for each of these channels, to reduce color variation, luminance variation, or both color and luminance variation of the observed image due to imperfections of the waveguide pupil replicators illustrated above. The controller 110 may be configured to adjust a distribution of optical power density of at least one of the plurality of the R, G, or B color channels, or the luminance channel, to at least partially offset the angular-dependent power throughput or color transfer function variation of the pupil expander 106. The controller 110 may further be configured to adjust the distribution of optical power density of the at least one of the R, G, B color channels, or the luminance channel, depending on position, orientation, or both, of the user's eye 114 determined by the eye tracking system 112. For embodiments where the performance of the pupil expander 106 is described by a color transfer function dependent on the pupil position, the controller 110 may be configured to obtain an image to be displayed by the NED 100, and then to modify a color distribution of the image to at least partially offset the color transfer function of the pupil expander 106 at the pupil position determined by the eye tracking system 112. A memory, e.g. an on-board non-volatile memory, may be provided in the NED 100, for storing data for modifications of the color channels of the image at each pupil position at the eyebox 108. The controller 110 may be operably coupled to the memory for retrieving at least a portion of the data corresponding to the pupil position determined by the eye tracking system 112, for modifying the color distribution of the image to at least partially offset the angular-dependent color transfer function variation of the pupil expander 106.

Referring now to FIG. 6, a display device 600 of the present disclosure is similar to the NED 100 of FIG. 1. The display device 600 of FIG. 6 includes an electronic display 602 comprising a plurality of pixels including first 604 and second 605 pixels, for providing a plurality of beams including first 614 and second 615 light beams shown with solid and dotted lines respectively. The optical power levels of the plurality of beams are in accordance with image data 609 received by the electronic display 602 from an image source, e.g. from a controller 610. An optics block 606 is configured to receive the plurality of light beams and to provide the plurality of light beams to an eyebox 608 of the display device 600. The electronic display 602 and the optics block 606 may be supported by a body 620.

A lens 607 of the optics block 606 may be used to convert coordinates of the plurality of pixels into corresponding beam angles of the plurality of light beams. For example, an angle of the first light beam 614 at an eyebox 608 corresponds to a coordinate of the corresponding first pixel 604 of the electronic display 602, and an angle of the second light beam 615 at the eyebox 608 corresponds to a coordinate of the corresponding second pixel 605 of the electronic display 602. It can be seen that the angle of the first 614 and second 615 light beams corresponds to a coordinate on a retina 624 of the user's eye 114. In this manner, the coordinates of the first 604 and second 605 pixels of the electronic display 602 correspond to locations on the retina 624 of the user's eye 114, enabling the user to see the image displayed by the electronic display 602. The throughput of the optics block 606 has a dependence on a beam angle of the light beam at the eyebox 608. For example, the throughputs for the first 614 and second 615 light beams can be different. The dependence of the throughput on the beam angle may come, for example, from using a waveguide-based pupil expander, similar to the pupil expander 106 of the NED 100 of FIG. 1. For example, in the embodiment shown in FIG. 6, the optics block 606 includes a waveguide 675 supporting an in-coupling diffraction grating 681, an out-coupling diffraction grating 682, and a pupil expansion diffraction grating 683. The controller 610 is operably coupled to the electronic display 602 and configured to update the image data 609 to at least partially offset the dependence of the throughput on the beam angle, e.g. by pre-emphasizing the image to be displayed in areas of low throughput, attenuating the image in areas of high throughput, or both.

The throughput of the optics block 606 may further depend on a beam coordinate of the light beam at the eyebox 608. The display device 600 may further include an eye tracking system 612 for determining at least one of position and orientation of the user's eye 114 at the eyebox 608. The controller 610 may be operably coupled to the eye tracking system 612 and configured to update the image data 609 so as to at least partially offset the dependence of the throughput on the coordinate and the angle of the light beam, by taking into account the at least one of position and orientation of the user's eye 114 determined by the eye tracking system 612.

In embodiments where the electronic display 602 is a color display, i.e. when the electronic display 602 comprises a plurality of color channels, the throughput of the optics block 606 may have a dependence on the coordinate and the angle of the light beam specific to each color channel. In such embodiments, the controller 610 may be configured to update the image data 609 on per color channel basis, that is, differently for each color channel, if needed. The image data 609 are updated by the controller 610 to at least partially offset the dependence of the throughput of the optics block 606 on the coordinate and the angle of the light beam for each color channel, by taking into account the at least one of position and orientation of a user's eye 114 determined by the eye tracking system 612.

Figure 7:
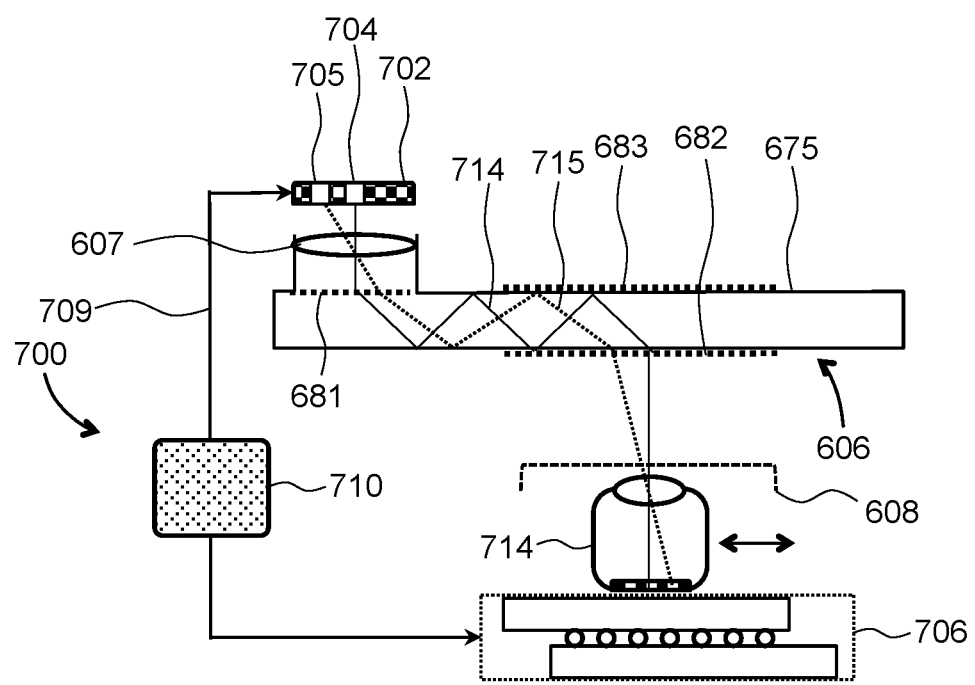
FIG. 7 is a schematic top view of a calibration apparatus for the NEDs of FIGS. 1 and 6.

The display device 600 of FIG. 6, and the NED 100 of FIG. 1 for that matter, may be calibrated to obtain the dependence of optical throughput on beam parameters such as angle or coordinate. Separate device components e.g. the pupil expander components, or the entire display devices may be calibrated. Turning to FIG. 7, a calibration apparatus 700 includes a test light source 702, a test camera 714 on a platform 706, and a test controller 710. The test light source 702 may include an electronic display having a plurality of pixels e.g. first 704 and second 705 pixels, for providing a plurality of beams including first 714 and second 715 light beams shown with solid and dotted lines respectively. Alternatively, the test light source 702 may include an extended light source of uniform light, e.g. white light with a Lambertian angular distribution. The test camera 714 may be constructed to closely mimic a human eye in its performance. For example, the test camera 714 may include a constant or variable input pupil having a pupil diameter or diaphragm matching the pupil diameter (or a range) of a human eye, an angle of view similar to that of a human eye, etc. The platform 706 may include a movable platform, a tiltable platform, or both. The movable platform may include X, XY, or XYZ translation stages for translating the test camera 714 in the dimensions of width, height, and depth.

Figure 8:
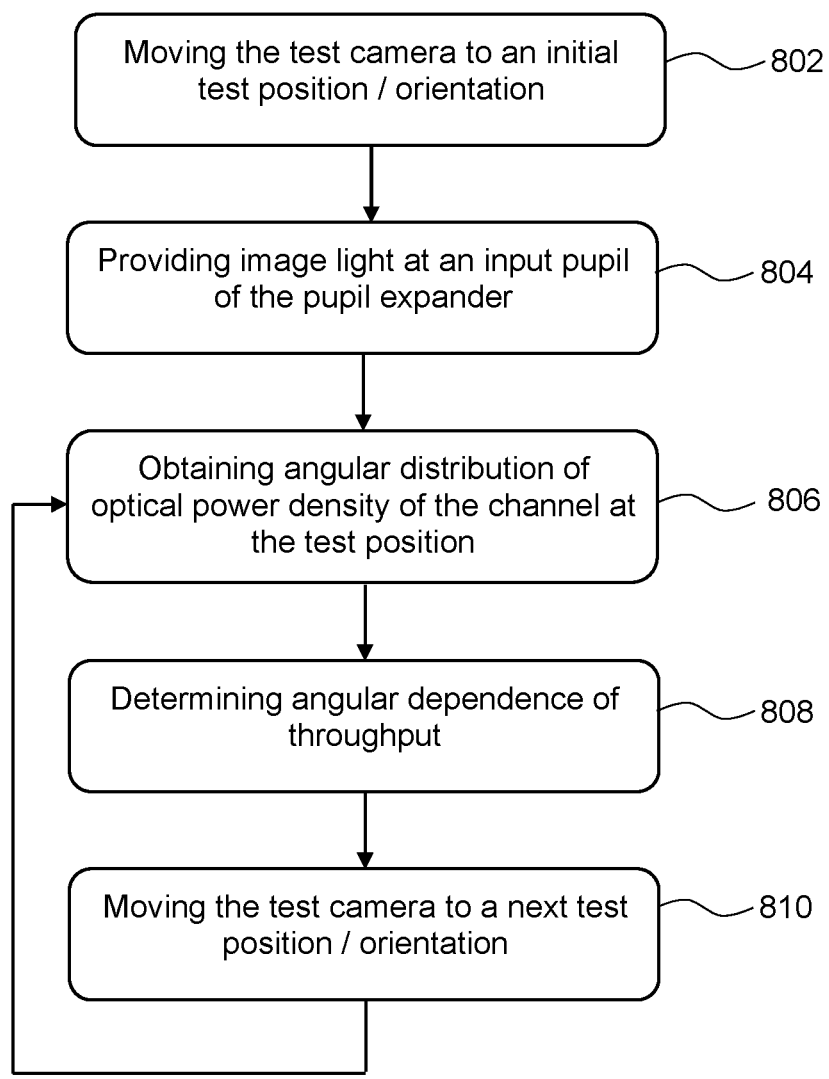
FIG. 8 is a flow chart of a calibration method for the NEDs of FIGS. 1 and 6.

The operation of the calibration apparatus will be described with further reference to FIG. 8 illustrating a method 800 of calibrating the optics block 606. The test controller 710 sends a command to the platform 706 to move (802) the test camera 714 to a first location having an initial position, orientation, or both. The test controller 710 sends a command 709 to the test light source 702 to provide (804) image light at an input pupil of the optics block 606, i.e. to the pupil expander. The image light may include a test pattern e.g. a grid pattern, a dot pattern, etc., or may be a simple uniform illumination pattern. The image light includes a channel to be calibrated, e.g. a luminance channel, a color channel, etc. Then, the test controller 710 sends a command to the test camera 714 to take an image to obtain (806) an angular distribution of optical power density of the channel at the first location at the eyebox 608 of the optics block 606. The test controller 710 then determines (808) an angular dependence of throughput of the optics block 606 from the angular distribution obtained in the previous step 806. Then, the test controller 710 may send a command to the platform 706 to move (810) the test camera 714 to a next location having an next position and/or orientation, and the process repeats. The angular dependence of throughput may be determined at the plurality of positions and/or orientations of the test camera 714 corresponding to the positions and orientations of the user's eye 114 at the eyebox 608. At each location, a corresponding image is obtained by taking a shot with the test camera 714.

As noted above, the calibration apparatus 700 may be used to test optics blocks, waveguide pupil expanders, and other components of wearable display systems. The calibration method 800 may also be implemented in actual manufactured display devices or NEDs, by configuring their controllers to perform test and calibration functions using the electronic display units of the NED devices themselves. For these embodiments, the testing apparatus may only require a test camera on a translation/rotation stage in combination with some fixture to place the NED on for testing.

Figure 9A:
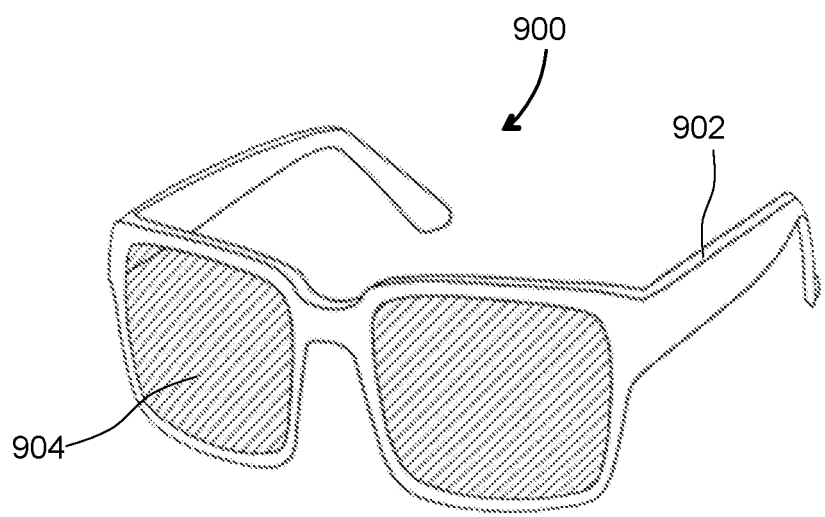
FIG. 9A is an isometric view of an eyeglasses form factor near-eye AR/VR display incorporating an NED of the present disclosure.
Figure 9B:
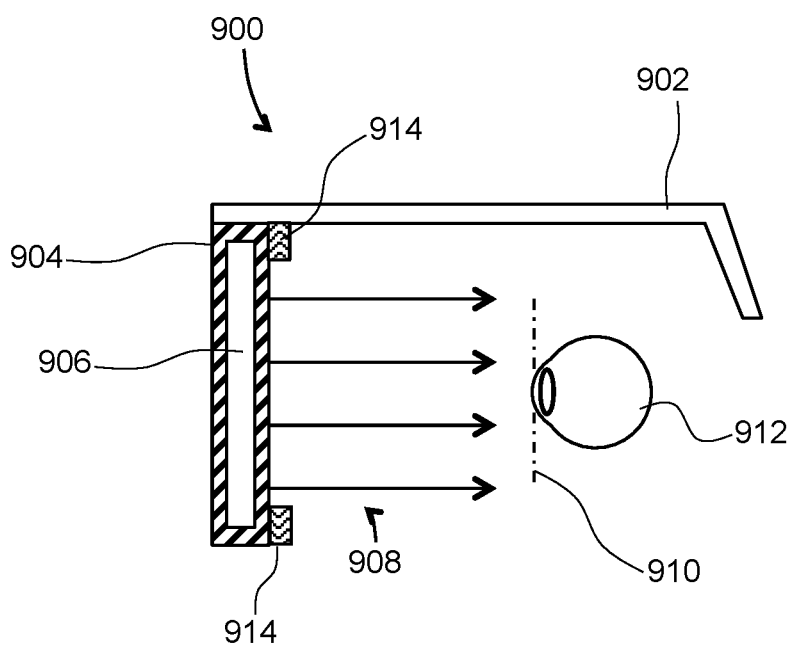
FIG. 9B is a side cross-sectional view of the display of FIG. 9A.

Referring now to FIGS. 9A and 9B, a near-eye AR/VR display 900 is an embodiment of the NED 100 of FIG. 1 or the display device 600 of FIG. 6. A body or frame 902 of the near-eye AR/VR display 900 has a form factor of a pair of eyeglasses, as shown. A display 904 includes a display assembly 906 (FIG. 9B), which provides image light 908 to an eyebox 910, i.e. a geometrical area where a good-quality image may be presented to a user's eye 912. The display assembly 906 may include a separate display module for each eye, or one display module for both eyes. For the latter case, an optical switching device may be coupled to a single electronic display for directing images to the left and right eyes of the user in a time-sequential manner, one frame for left eye and one frame for right eye. The images are presented fast enough, i.e. with a fast enough frame rate, that the individual eyes do not notice the flicker and perceive smooth, steady images of surrounding virtual or augmented scenery.

An electronic display of the display assembly 906, i.e. an electronic display of the image projector 102 of FIG. 1 or the electronic display 602 of FIG. 6, may include, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, or a combination thereof. The near-eye AR/VR display 900 may also include an eye-tracking system 914 for determining, in real time, the gaze direction and/or the vergence angle of the user's eyes 912. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, dynamically creating additional objects or pointers, etc. Furthermore, the near-eye AR/VR display 900 may include an audio system, such as small speakers or headphones.

Figure 10:
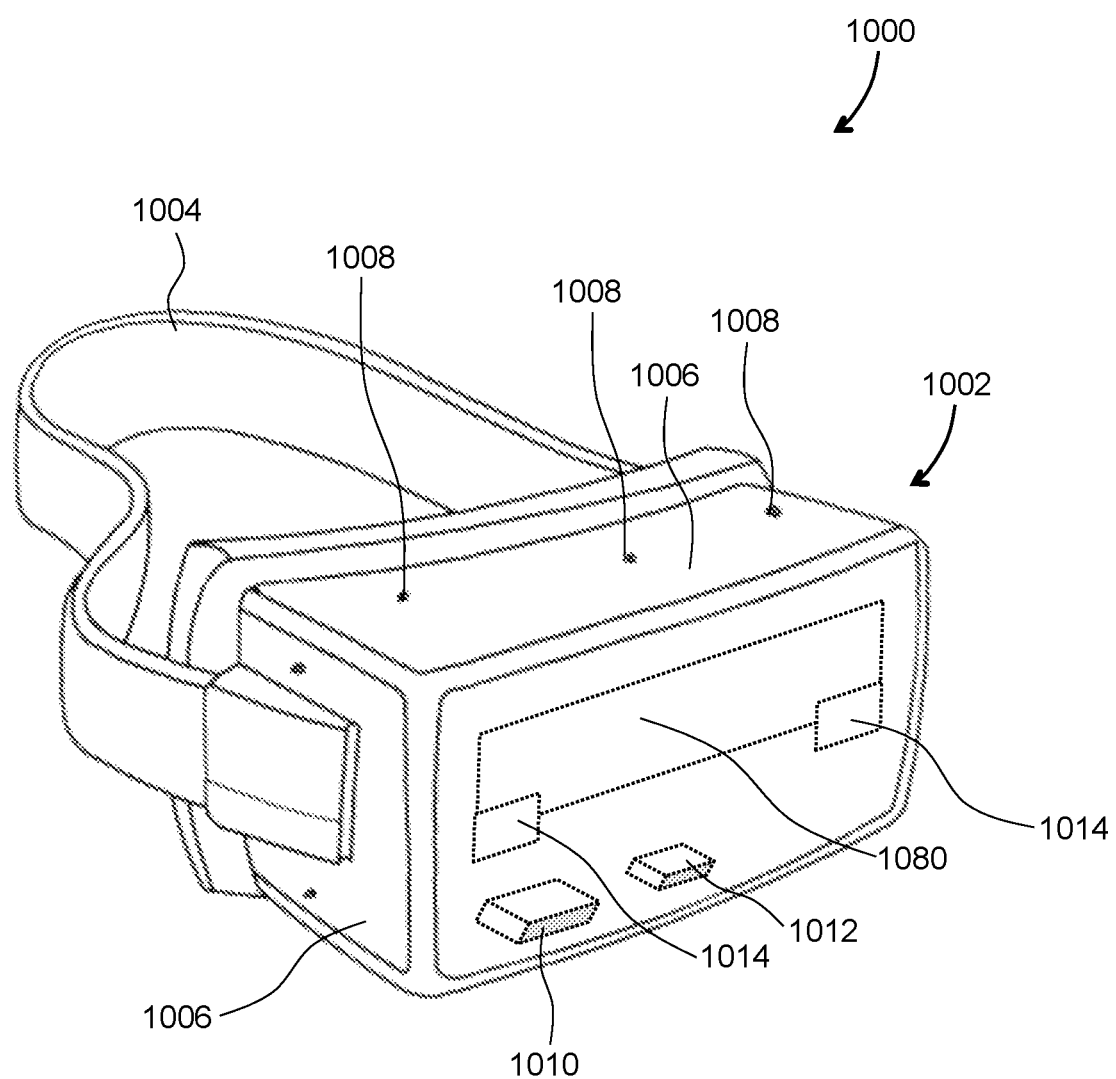
FIG. 10 is an isometric view of a head-mounted display (HMD) incorporating an NED of the present disclosure.

Turning to FIG. 10, an HMD 1000 is an example of an AR/VR wearable display system which encloses the user's face, for a greater degree of immersion into the AR/VR environment. The HMD 1000 can present content to a user as a part of an AR/VR system, which may further include a user position and orientation tracking system, an external camera, a gesture recognition system, control means for providing user input and controls to the system, and a central console for storing software programs and other data for interacting with the user for interacting with the AR/VR environment. The function of the HMD 1000 is to augment views of a physical, real-world environment with computer-generated imagery, and/or to generate the entirely virtual 3D imagery. The HMD 1000 may include a front body 1002 and a band 1004. The front body 1002 is configured for placement in front of eyes of a user in a reliable and comfortable manner, and the band 1004 may be stretched to secure the front body 1002 on the user's head. A display system 1080 may include the NED 100 of FIG. 1 or the display device 600 of FIG. 6. The display system 1080 may be disposed in the front body 1002 for presenting AR/VR imagery to the user. Sides 1006 of the front body 1002 may be opaque or transparent.

In some embodiments, the front body 1002 includes locators 1008, an inertial measurement unit (IMU) 1010 for tracking acceleration of the HMD 1000, and position sensors 1012 for tracking position of the HMD 1000. The locators 1008 are traced by an external imaging device of a virtual reality system, such that the virtual reality system can track the location and orientation of the entire HMD 1000. Information generated by the IMU and the position sensors 1012 may be compared with the position and orientation obtained by tracking the locators 1008, for improved tracking of position and orientation of the HMD 1000. Accurate position and orientation is important for presenting appropriate virtual scenery to the user as the latter moves and turns in 3D space.

The HMD 1000 may further include an eye tracking system 1014, which determines orientation and position of user's eyes in real time. The obtained position and orientation of the eyes allows the HMD 1000 to determine the gaze direction of the user and to adjust the image generated by the display system 1080 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1002.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A near-eye display (NED) comprising:
    an image projector for providing image light comprising a channel;
    a waveguide pupil expander coupled to the image projector for relaying the image light to an eyebox of the NED, wherein throughput of the waveguide pupil expander has a dependence on a beam coordinate and a beam angle at the eyebox;
    an eye tracking system for providing a position of a pupil of the user's eye at the eyebox; and a controller operably coupled to the image projector and the eye tracking system and configured to adjust an angular distribution of optical power density of the channel of the image light depending on the position of the pupil of the user's eye at the eyebox, to at least partially offset the dependence of throughput of the waveguide pupil expander on the beam coordinate and the beam angle.

2. The NED of claim 1, wherein the eye tracking system is configured to provide at least one of position or orientation of a user's eye at the eyebox, wherein the controller is configured to adjust the angular distribution of optical power density of the channel depending on the at least one of position or orientation of the user's eye determined by the eye tracking system.

3. The NED of claim 2, wherein the controller is configured to use the at least one of the position or orientation of the user's eye to determine the position of the pupil of the user's eye at the eyebox.

4. The NED of claim 1, wherein the channel comprises at least one of a color channel or a luminance channel.

5. The NED of claim 1, wherein the image light comprises a plurality of color channels including the channel, wherein throughput of the waveguide pupil expander for each color channel has an angular dependence, whereby the waveguide pupil expander has an angular-dependent color transfer function variation; and
wherein the controller is configured to adjust the angular distribution of optical power density of at least one of the plurality of color channels to at least partially offset the angular-dependent color transfer function variation of the waveguide pupil expander.

6. The NED of claim 5, wherein the controller is configured to adjust the angular distribution of optical power density of the at least one of the plurality of color channels depending on the pupil position of the user's eye determined by the eye tracking system.

7. The NED of claim 1,
wherein the channel comprises a color channel, and wherein the waveguide pupil expander has a color transfer function having a dependence on the pupil position, and wherein the controller is configured to:
obtain an image to be displayed by the NED; and
modify a color distribution of the image to at least partially offset the dependence of the color transfer function of the waveguide pupil expander on the pupil position determined by the eye tracking system.

8. The NED of claim 7, further comprising memory having stored thereon data for modifications of the color distribution of the image at each pupil position at the eyebox;
wherein the controller is operably coupled to the memory for retrieving at least a portion of the data corresponding to the pupil position determined by the eye tracking system, for modifying the color distribution of the image to at least partially offset the dependence of the color transfer function on the pupil position.

9. The NED of claim 8, wherein the data comprises a look-up table.

10. The NED of claim 1, wherein the waveguide pupil expander comprises a two-dimensional (2D) waveguide pupil expander.

11. A display device comprising:
an electronic display comprising a plurality of pixels for providing a plurality of light beams in accordance with image data received by the electronic display;
an optics block configured to receive the plurality of light beams and to provide the plurality of light beams to an eyebox of the display device, such that an angle of a first light beam of the plurality of light beams at the eyebox corresponds to a coordinate of a corresponding first pixel of the plurality of pixels of the electronic display, wherein throughput of the optics block for the first light beam has a dependence on a beam coordinate and a beam angle of the first light beam at the eyebox;
an eye tracking system for providing a position of a pupil of the user's eye at the eyebox; and
a controller operably coupled to the electronic display and the eye tracking system and configured to modify the image data by at least one of: pre-emphasizing an image to be displayed in areas of low throughput; or attenuating the image in areas of high throughput, depending on the position of the pupil of the user's eye at the eyebox provided by the eye tracking system, so as to at least partially offset the dependence of the throughput of the optics block on the beam coordinate and the beam angle.

12. The display device of claim 11, wherein the eye tracking system is configured to determine at least one of position and orientation of a user's eye at the eyebox; and
wherein the controller is configured to update the image data so as to at least partially offset the dependence of the throughput on the coordinate and the angle of the first light beam, by taking into account the at least one of position and orientation of the user's eye determined by the eye tracking system.

13. The display device of claim 12, wherein the electronic display comprises a plurality of color channels, wherein the throughput of the optics block has a dependence on the coordinate and the angle of the first light beam for each color channel; and
wherein the controller is configured to update the image data on per color channel basis, to at least partially offset the dependence of the throughput of the optics block on the coordinate and the angle of the first light beam for each color channel, by taking into account the at least one of position and orientation of a user's eye determined by the eye tracking system.

14. The display device of claim 11, wherein the optics block comprises a waveguide pupil expander.

15. A method for providing an image, the method comprising:
providing image light at an input pupil of a pupil expander, the image light comprising a channel;
obtaining an angular distribution of optical power density of the channel at a plurality of locations at an output pupil of the pupil expander;
determining an angular dependence of throughput of the pupil expander from the obtained angular distribution at each one of the plurality of locations; and
adjusting an image to be displayed to at least partially offset the determined angular dependence of throughput of the pupil expander depending on a position of a pupil of a user's eye at an eyebox determined by an eye tracking system.

16. The method of claim 15, wherein determining the angular dependence of throughput at the first location comprises placing a camera at the first location and obtaining a first image with the camera.

17. The method of claim 15, wherein determining the angular dependence of throughput at the plurality of locations comprises placing a camera at each location and obtaining a corresponding image with the camera.

18. The method of claim 15, wherein the pupil expander comprises a waveguide pupil expander.

19. The method of claim 15, wherein the channel comprises at least one of a color channel or a luminance channel.

* * * * *